United States Patent
Capobianco (10) Patent No.: US 11,334,437 B2
(45) Date of Patent: May 17, 2022

(54) METHOD TO RECOVER AN ERROR STATE IN A SERIAL COMMUNICATION WITH AN INTEGRATED CIRCUIT CARD, CORRESPONDING SYSTEM AND COMPUTER PROGRAM PRODUCT

(71) Applicant: STMicroelectronics S.r.l., Agrate Brianza (IT)

(72) Inventor: Luigi Capobianco, Maddaloni (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 115 days.

(21) Appl. No.: 16/983,628

(22) Filed: Aug. 3, 2020

(65) Prior Publication Data
US 2021/0042193 A1 Feb. 11, 2021

(30) Foreign Application Priority Data
Aug. 9, 2019 (IT) .......................... 102019000014595

(51) Int. Cl.
| | |
|---|---|
| *G06F 11/00* | (2006.01) |
| *G06F 11/14* | (2006.01) |
| *G06F 1/10* | (2006.01) |
| *G06F 13/42* | (2006.01) |
| *G06F 1/24* | (2006.01) |

(52) U.S. Cl.
CPC ............ *G06F 11/1441* (2013.01); *G06F 1/10* (2013.01); *G06F 1/24* (2013.01); *G06F 13/4291* (2013.01); *G06F 2201/805* (2013.01)

(58) Field of Classification Search
CPC . H04B 1/3816; H04B 1/3818; G06F 13/4282; G06F 13/4291; G06F 11/1441; G06F 1/10; G06F 1/24
See application file for complete search history.

(56) References Cited

U.S. PATENT DOCUMENTS

| | | | | |
|---|---|---|---|---|
| 2007/0173215 | A1* | 7/2007 | Frodsham | ................. G06F 1/24 455/158.3 |
| 2012/0327819 | A1* | 12/2012 | Liang | ..................... G06K 19/07 370/277 |
| 2016/0196233 | A1 | 7/2016 | Chen et al. | |

FOREIGN PATENT DOCUMENTS

WO 9814885 A1 4/1998

\* cited by examiner

*Primary Examiner* — Michael Maskulinski
(74) *Attorney, Agent, or Firm* — Slater Matsil, LLP

(57) ABSTRACT

In an embodiment a method for recovering an error state of an integrated circuit card, wherein the integrated circuit card is coupled to a transmitter device via a serial communication interface including at least a serial clock signal line on which a serial clock signal is transmittable from the transmitter device to the integrated circuit card, wherein the method includes upon detecting the error state, embedding, by the transmitter device, a reset signal in the serial clock signal; sending, by the transmitter device, the serial clock signal as reference clock signal on the serial clock signal line to the integrated circuit card, the reset signal representing a variation of parameters of the serial clock signal; checking, by the integrated circuit card, a presence of the variation of parameters of the serial clock signal; and upon checking the presence of the variation of parameters, performing, by the integrated circuit card, a transition from the error state to a reset state.

20 Claims, 6 Drawing Sheets

METHOD TO RECOVER AN ERROR STATE IN A SERIAL COMMUNICATION WITH AN INTEGRATED CIRCUIT CARD, CORRESPONDING SYSTEM AND COMPUTER PROGRAM PRODUCT

CROSS-REFERENCE TO RELATED APPLICATIONS

This application claims the benefit of Italian Patent Application No. 102019000014595, filed on Aug. 9, 2019, which application is hereby incorporated herein by reference.

TECHNICAL FIELD

The present disclosure relates to solutions concerning recovering an error state of an integrated circuit card, in particular an eUICC (embedded Universal Integrated Circuit Card). The present disclosure further relates to techniques for performing a serial communication between an embedded integrated circuit card (eUICC) and a card reader, e.g., in a mobile communication device.

BACKGROUND

The technical domain of the solution is the serial communication between an embedded Universal Integrated Circuit Card (eUICC) and a corresponding reader device, which is able to transfer data\information (with accompanying clock) using a serial interface. An example of such interface can be the Serial Peripheral Interface (SPI), an interface bus commonly used to send data between devices\microcontrollers or the ISO 7816-3 interface used for Smart cards communication. On the basis of any serial connection, the data are transferred using a serial protocol which is usually implemented as a state machine in the processing units of the transmitter and of the receiver, e.g. in the master device and slave device in the SPI.

Figures 1, 2:
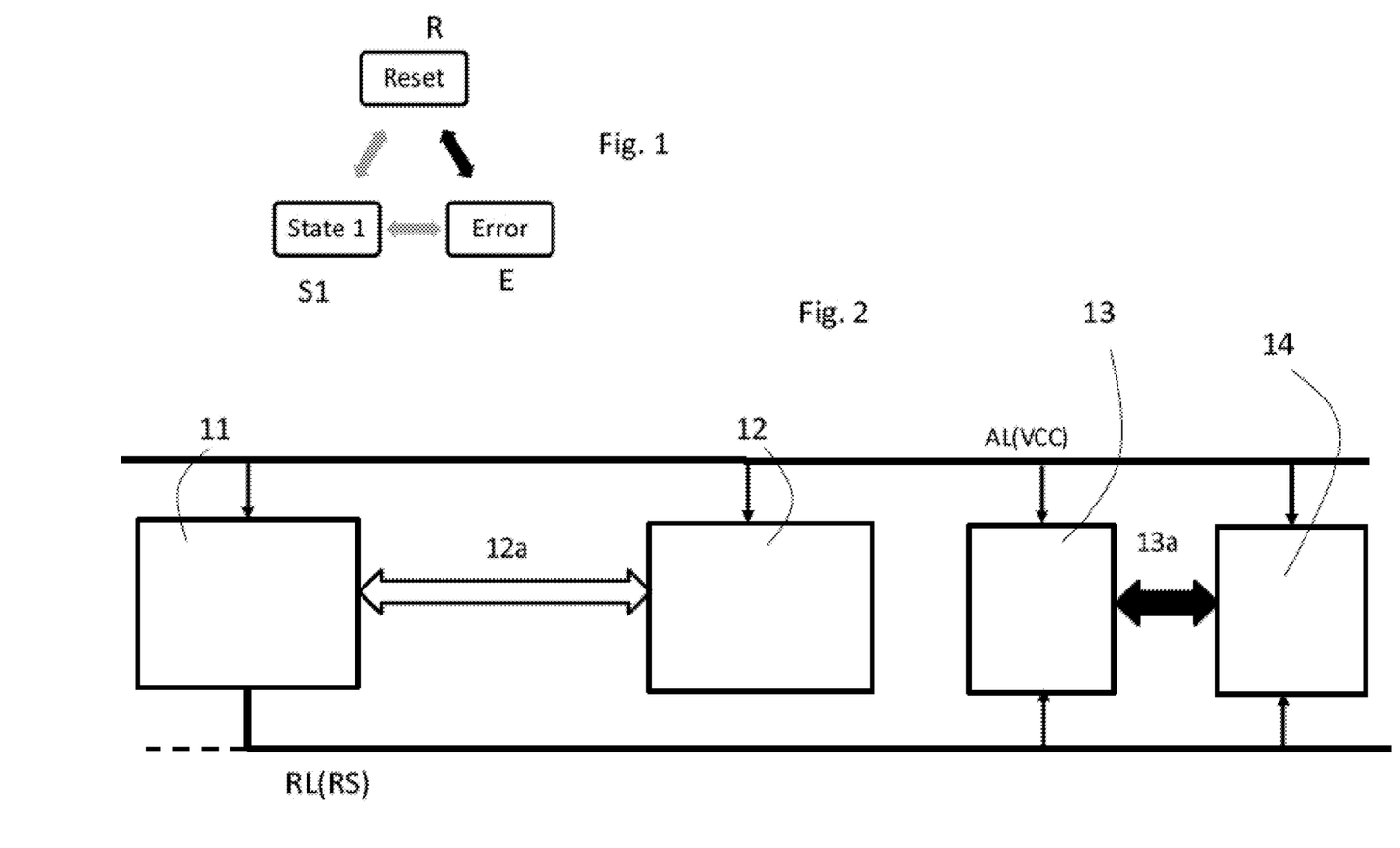

As shown in FIG. 1, representing schematically a protocol state machine, from a first state S1 which represents an operative state in which for instance transfer data takes place, the serial interface between the transmitter (reader) and the receiver (card) can enter an error state E, which requires then a transition to a reset state R to resume then the first operative state S1.

SUMMARY

In FIG. 2 is represented a possible architecture of a communication system 10 including an eUICC. The communication system 10 may be included in a hosting device such a mobile communication device or an industrial communication device, i.e. hosting devices including eUICC Industrial cards or eUICC Consumer cards.

A first transmitter device is indicated with 11, which is connected to a second receiver device 12, which is an eUICC, by a serial interface 12a, in particular a SPI interface. The first device 11 may be a reader of the eUICC card, e.g. a LPA (Local Profile Assistant) module, or in general a module comprising a processing unit operating as a modem for communication from and to a communication device containing the eUICC 12. The first transmitter device 11 receives through a voltage supply line AL a voltage supply VCC, such eUICC 12 and also a third and a fourth device 13 and 14 being coupled too to the voltage supply line AL for receiving power supply. Such devices 13 and 14 may represent memories for storing the operative system of the mobile communication device or applications being executed by the operating system, or other modules in the communication device. A reset line RL is shown, carrying a reset signal RS which is suitable to reset one of the devices 11, 12, 13, 14, from an error state E. However it is depicted the case in FIG. 2 where only devices 11, 13 and 14 are coupled to the reset line RL, which the eUICC 12 it is not, for instance because it has no reset pin. The devices 13 and 14 are coupled one to the other by a serial interface 13a, which may be the same SPI interface.

The reader 11 may be coupled to a mobile communication interface for communication with a base station, which may comprise a GSM (Global System for Mobile Communications), CDMA (Code Division Multiple Access) transceiver, W-CDMA (Wideband Code Division Multiple Access), UMTS (Universal Mobile Telecommunications System), HSPA (High-Speed Packet Access) and/or LTE (Long Term Evolution) transceiver.

The serial interface 12a which exchanges data between the transmitter 11 and a processing unit of the embedded system in the eUICC 12 may be a digital communication interface, such as a UART (Universal Asynchronous Receiver-Transmitter), SPI (Serial Peripheral Interface) and/or USB (Universal Serial Bus) communication interface.

Based on the system 10 shown in FIG. 2, it can be observed that there are systems designed with only one power line Vcc common to all components, including the eUICC, but also systems where the reset pin may not be coupled to one or more device, including the eUICC. Also such systems may alternate the use of the same serial interface between several components, including the eUICC. Systems developed with the limitations described above may thus be part of the eUICC ecosystem In particular, the presence of one shared power line and\or the absence of a physical reset pin may be a quite strong limitation in the solutions used to interconnect eUICC and other systems\devices through serial interface communication.

There are several applicative scenarios for eUICC in which the presence of a recovery procedure which uses alternative signals may be useful. In case of error of any kind, the eUICC may lose the ability to get correctly the protocol commands from the transmitter device and so requires a reset of the protocol state machine shown in FIG. 1.

The inability to recover data from the serial input stream could make difficult to reset the state machine of the protocol between transmitter and eUICC, i.e. This may result in a situation known as deadlock where the receiving device and transmitting device are no longer able to understand and communicate with one another. As shown, sometimes not all devices have enough pins to guarantee an electrical\physical reset of the protocol state machine established on the top of the (serial) communication.

Since sometimes the same serial interface can be shared between the eUICC and other devices, as shown in FIG. 2, thus having the serial interface blocked by the eUICC due to a non-recoverable error represents a serious inconvenient also for the other devices.

Devices such as the eUICC have only one physical reset pin but may need to communicate with two different devices through different serial interfaces (e.g., SPI and ISO\UART). Sometimes it may happen that a physical reset coming from one serial interface can interfere with the activity on the other one. Thus, another inconvenient may be that one may be unable to reset only one of the communication interfaces.

Figure 3:
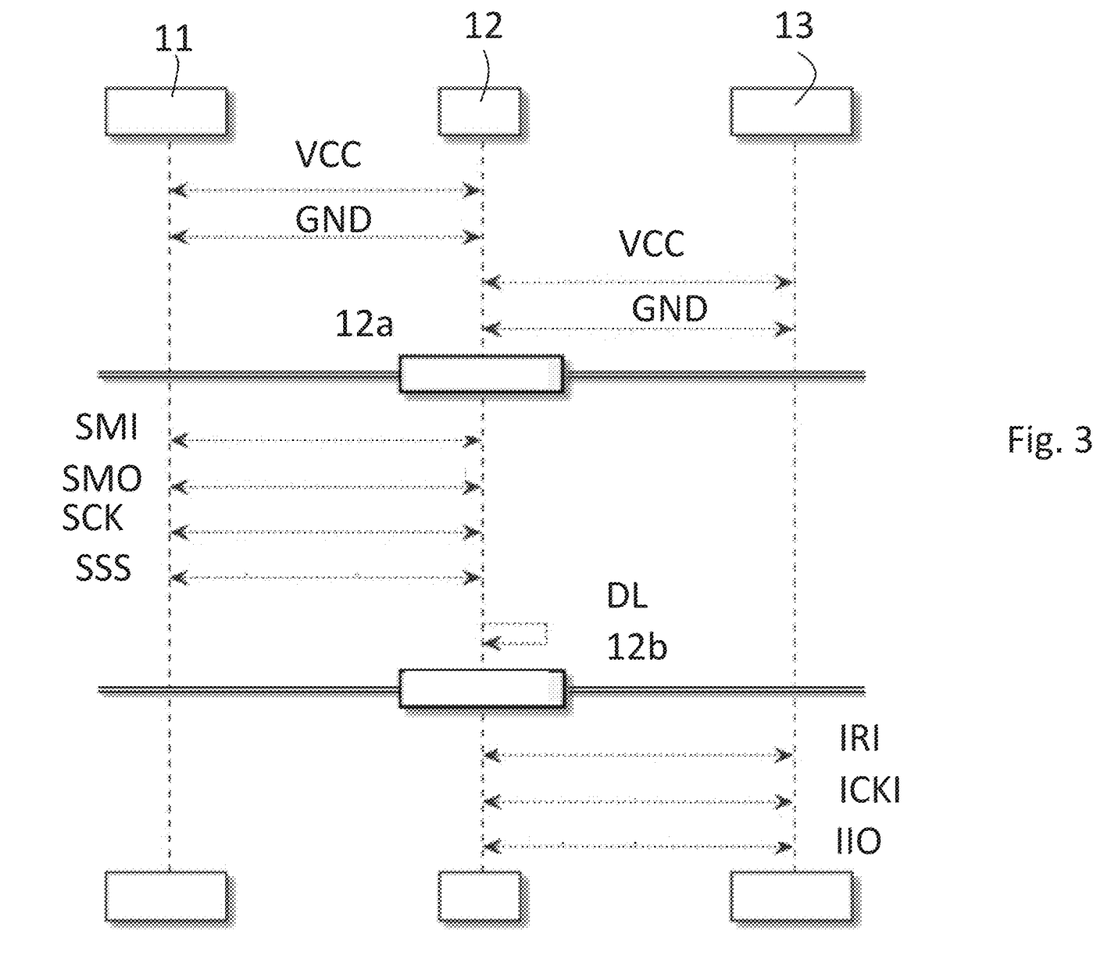

In FIG. 3 it shown a signal diagram showing a scenario in which the transmitter device 11 communicates via the SPI Interface 12a with the eUICC 12 and the further device 13 communicates via an ISO interface 12b with the eUICC 12. Power supply VCC and ground GNS which are shared by the power supply line AL are shown, then interface 12a provides a pin connections SMI, i.e. SPI MISO, SMO, i.e. SPI MOSI, SCK, i.e. the SPI clock input, and SSS, i.e. the NSS slave select signal, between reader 11 and eUICC 12. The ISO interface 12b includes a reset signal input IRI, an ISO clock signal input ICKI, and an ISO data input/output IIO. A deadlock DL is also shown, on the SPI interface 12a, which, in absence of a reset pin, cannot be recovered by a physical reset made by the device 13 on reset signal input IRI because it is independent and unaware or because the reset would interfere with its activity. The deadlock DL on the eUICC 12 on SPI 12a may also reverberate on the second interface making it useless any reset or attempted recovery by the further device 13. In such situation only the transmitter device 11 can reset the eUICC 12 activity on SPI interface 12a and then recover the error, but it does not have any physical reset pin available in the eUICC 12 to this purpose.

Some solutions to the problem of recovering from the deadlock could be: provide a physical reset to the blocked eUICC or turn the voltage supply Vcc on and off of the system. However, as shown with reference to FIG. 2 there are devices where a specific reset pin is not available, or it is not possible to turn off and on the common power supply, as this would damage other components\subsystems different from the eUICC. This inconvenience is enhanced by the fact that the eUICC is usually soldered, or in any case made hardly accessible) in the hosting device, this making further difficult to intervene in order to provide a physical reset solution.

Embodiments provide solutions which overcome one or more of the above drawbacks.

Further embodiments provide a method for recovering an error state in a serial communication with an integrated circuit card. Other embodiments provide a related system, method and computer program product.

In embodiments, the present disclosure relates to a method for recovering an error state in a serial communication with an integrated circuit card, in particular an eUICC, where a serial communication protocol includes a transition from said error state to a reset state upon reception of a reset signal by said integrated circuit card, said serial communication including operating on a serial communication interface comprising at least a serial clock signal line coupling a transmitter device and said integrated circuit card and on which a clock signal is transmitted from the transmitter device to said integrated circuit card, said method including, upon detection of an error state, embedding at the transmitter device said reset signal in a serial clock signal sent to the integrated circuit card as reference clock signal on said serial clock signal line, said reset signal being represented by a variation of parameters of the clock signal, checking the presence of said variation of parameters of the clock signal at the integrated circuit card, and upon checking the presence of said variation of parameters of the clock signal at the integrated circuit card (performing said transition from an error state to a reset state.

In variant embodiments, said variation of parameters of the clock signal at the integrated circuit card comprises varying the clock signal frequency.

In variant embodiments, said variation includes performing a voltage to frequency conversion.

In variant embodiments, said variation of parameters of the clock signal at the integrated circuit card comprises varying the clock duty cycle.

In variant embodiments, said variation of parameters of the clock signal at the integrated circuit card comprises varying the duty cycle through a pulse width modulation.

In variant embodiments, said variation of parameters of the clock signal encodes further commands or instructions to the integrated circuit card different from said reset signal.

In variant embodiments, upon detection of an error state the transmitter device and the integrated circuit card enter a clock processing state during which they perform such variation of parameters of the clock signal and checking the presence of said variation of parameters of the clock signal, respectively, then the transmitter and the integrated circuit card enter the reset state in a time aligned manner.

Yet other embodiments relate to a communication system comprising a serial communication interface comprising at least a data line and a serial clock signal line coupling a transmitter device and an integrated circuit card configured to operate according to the method of any of the above embodiments.

In variant embodiments, said transmitter device includes a clock modifier circuit configured to perform said variation of parameters of the clock signal and the integrated circuit card includes a clock sampler circuit configured to detect the variation of a determined parameter of the serial clock signal on the clock signal line of the serial interface.

In variant embodiments, said integrated circuit card is an eUICC.

In variant embodiments, said id communication system is comprised in a hosting device, in particular a mobile communication device and said transmitter is a module comprising a processing unit operating as a modem for communication from and to a communication device containing the integrated circuit card.

The present disclosure relates also to a computer program product directly loadable into the internal memory of a digital computer, comprising software code portions.

BRIEF DESCRIPTION OF THE DRAWINGS

Embodiments of the present disclosure will now be described with reference to the annexed drawings, which are provided purely by way of non-limiting example and in which:

FIGS. 1-3 have been described in the foregoing; is a schematic circuit diagram of an embodiment of the solution here described;

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Since, as indicated, there are case of an eUICC coupled by a serial interface where a specific reset pin is not available, or it is not possible to turn off and on the power supply line, the method here described provides using the serial clock signal of the serial interface to provide a reset signal, i.e. an error recovery sequence, which performs the transition from the error state E to the reset state R, in FIG. 1, i.e. a "reset" command\sequence to the eUICC if it has lost the ability to receive the logical commands on data line, in case of error or deadlock.

Figure 4:
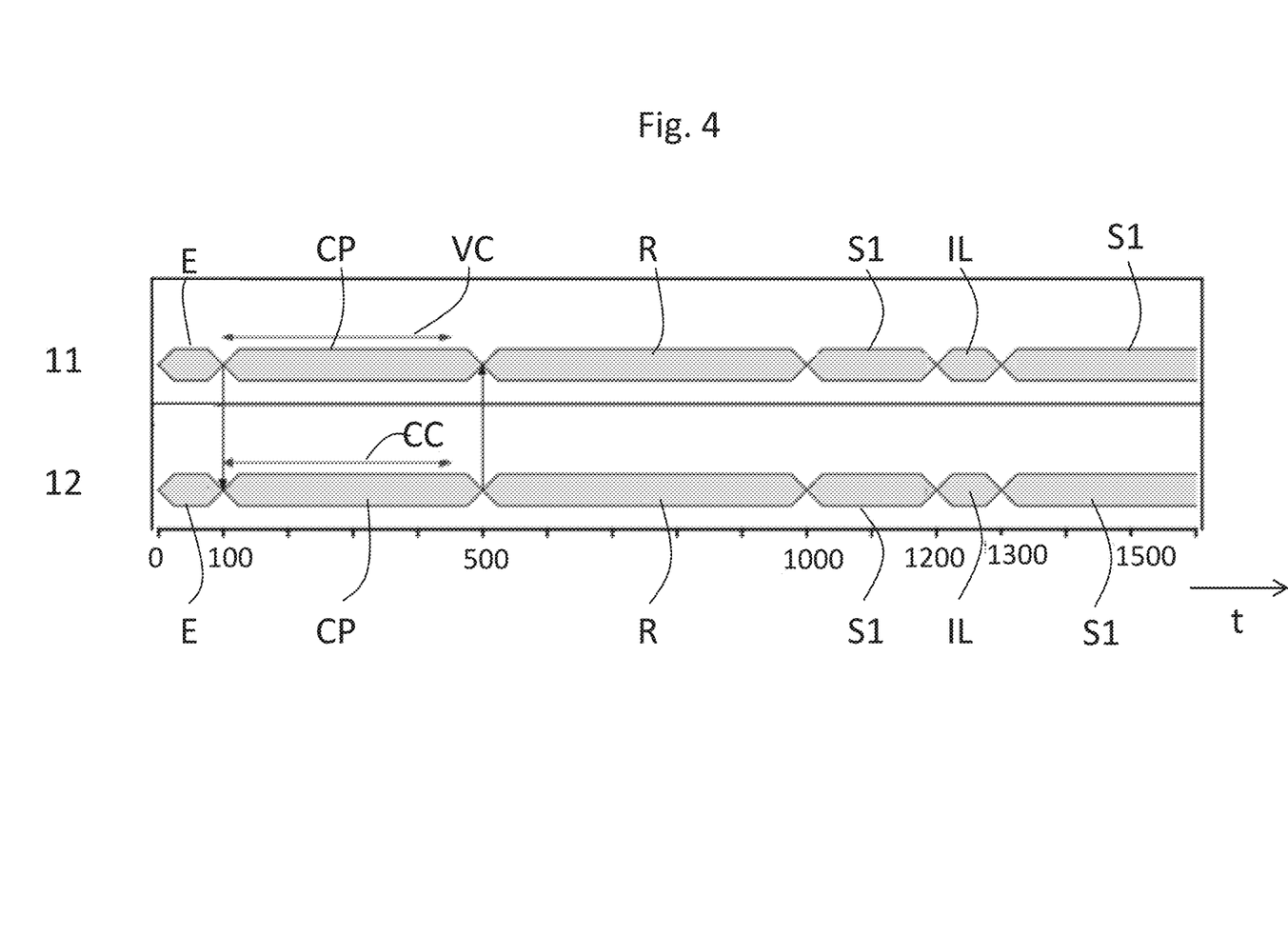
FIG. 4 shows a diagram representing communication protocol states taken by the transmitter and receiver according to the method here described.

In FIG. 4 it shown the evolution with time t of the state of the transmitting device 11 and of the eUICC 12, i.e. receiving device. At time t=0 the system is in error state E, then the transmitting device 11 enters a clock processing state CP in which applies a variation VC of a clock parameter to the clock signal of the interface 12a, e.g. the clock signal on the SPI clock line SCK. The eUICC 12 also enters the clock processing state CP and performs an operation CC of checking the clock signal on the SPI clock line SCK to detect a variation of a clock parameter to the clock signal. The transmitter device 11 subsequently transitions to the reset state R, while the eUICC 12 is configured to interpret, in the checking operation CC, such a variation of a clock parameter to the clock signal as a reset signal and transition to the reset state R as well. The operation of the state machine of FIG. 1 can be thus resumed, and subsequently the protocol transitions to the operative state S1, for instance with idle intervals IL, according to the normal protocol provisions.

The recovery of the protocol reset state R by the eUICC 12 is thus performed through a sampling of the variations of some parameters of the clock signal supplied on the serial interface by the transmitter device 11 in the clock processing state CP.

As indicated, the process requires operating a variation VP of some parameter of the clock signal supplied to the receiving device 12, so that it can return to the protocol state machine "Reset" when the variation of the clock parameter is detected. Such clock parameters include in general any parameter defining the evolution of the clock signal in time, and preferably include the clock signal frequency and/or the duty cycle. However, also a variation of the amplitude or variation of jitter or phase noise or variations of the wave shape, e.g. rise time variations, may be used to represent the reset signal.

In general, as the managing of the serial protocol interface state are performed by respective processing unit of the transmitter 11 and of the eUICC 12, these processing units are preferably configured to command also the variation VC of a clock parameter and the operation CC of checking the clock signal on the SPI clock line SCK to detect a variation of a clock parameter to the clock signal, respectively, in particular by commanding and controlling specific circuits or modules configured to perform such operations VC, CC.

Figure 5:
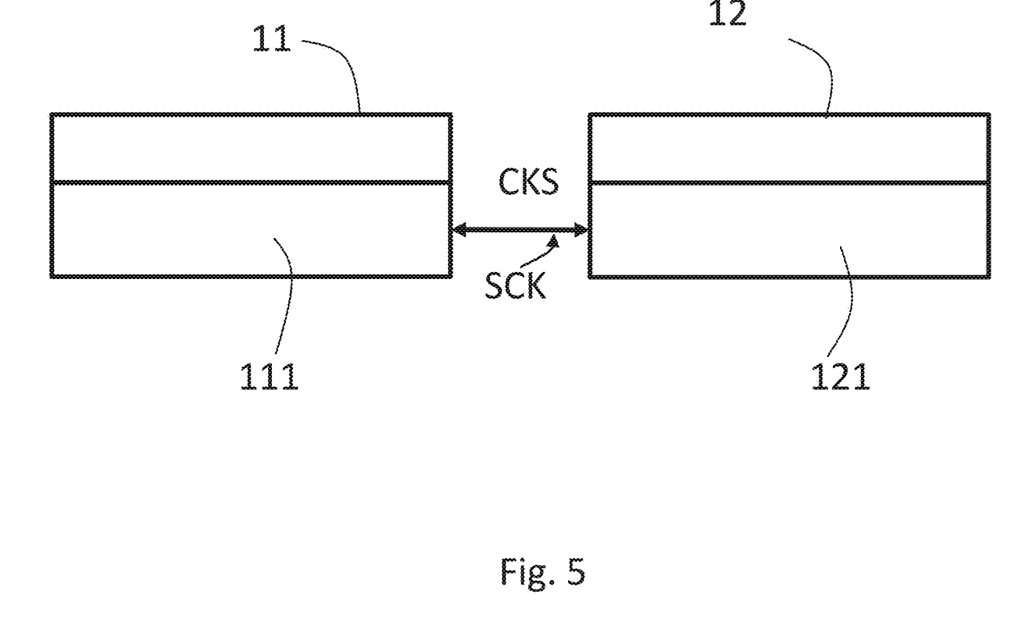
FIG. 5 shows a principle block schematic of a system implementing the method here described.

With reference to FIG. 5 where a partial representation of a system with the transmitter device 11 and eUICC 12 is shown, the transmitter device 11 includes a clock modifier circuit in which is configured to vary a determined parameter of the serial clock signal CKS on the clock signal line SCK of the serial interface 12a, to embed a corresponding reset signal RS in the serial clock signal CKS. The eUICC receiver device 12 includes a clock sampler circuit 121 which is configured to detect the variation of a determined parameter of the serial clock signal CKS on the clock signal line SCK of the serial interface 12a.

The transmitter device 11 is configured so that when it obtains the information that the eUICC receiver device 12 is not responsive and a "protocol" reset R is needed, commands the clock modifier circuit 111 to produce a variation of a parameter the clock signal CKS, in particular the clock frequency or the clock duty cycle. The transmitter device 11 enters thus reset state R.

The clock sampler circuit 121 samples the clock signal CKS measuring the corresponding clock parameter, i.e. clock frequency or the clock duty cycle, and it is configured to interpret a determined variation of such parameter as a command for the eUICC 12 to enter reset state R, thus aligning both devices, transmitter 11 and receiver 12 to the protocol reset state R so that the communication can resume. In other words, the transmitter 11 performs the change of the clock parameter and enters the reset state R, the eUICC 12 samples the variation and enters the reset state R consistent with the transmitter 11.

In order to perform such solution it performed a decomposition of the device serial protocol and definition of relevant states such as reset state R, frame received, response transmitted, etc., . . . . An error state E may be associated to specific conditions regarding acknowledgements, or frame received or response transmitted or other, which define for instance a condition in which the eUICC 12 is unresponsive or responds with wrong data.

Figure 7:
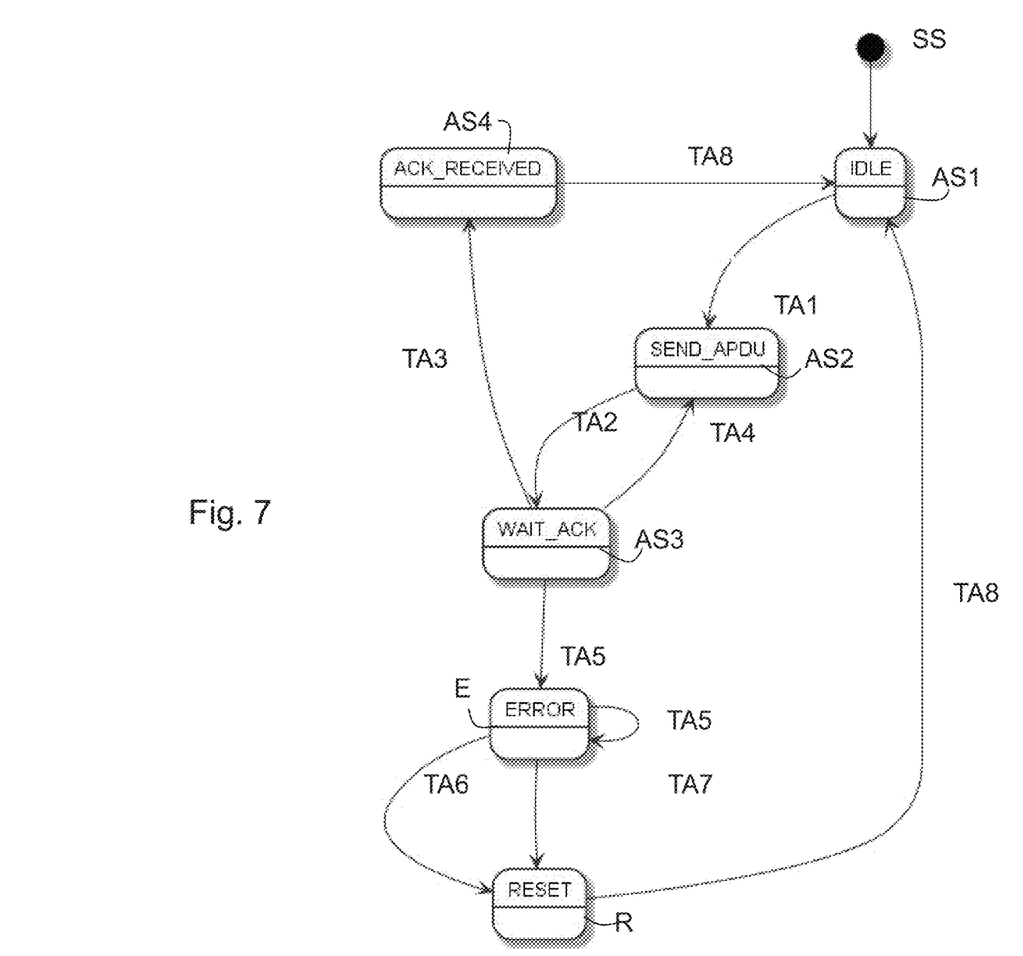
FIG. 7 shows a state diagram representing an example of occurrence of an error state in a serial interface.

For instance, in FIG. 7 it is exemplified with a state diagram an example in which the serial interface is a serial interface and an APDU is transmitted over the interface. Transmission of an APDU (Application Protocol Data Unit) is a typical activity for a transmitter and an integrated card 12. The diagram represents the state at the transmitter 11. In particular, SS indicates a start state, from which an idle state AS1 is entered. From the idle state AS1 with an action TA1 of requesting transmission of an applicative APDU a send APDU state AS2 is reached. If a send APDU action AS2 is performed the transmitter passes to a wait ACK state AS3, which can go back to state AS2 if a NACK (not acknowledge character or message) received action TA4 or to an ACK (acknowledge character or message) received status AS4 if an ACK reception action TA3 is detected. If when in wait ACK state AS3 other is received than ACK or NACK (action TA5) the error state E is reached, which is maintained while still receiving than ACK or NACK TA5. A power off action TA6 or sending an abort command and receive ATR TA7 can perform the transition to the reset state R. From reset R or ACK received state AS5 a wait for applicative action TA8 returns to idle state AS1.

If during the processing of the command or APDU the transmitter 11 reaches the error state E and it is not possible to switch off and restart the eUICC (e.g., Power off "transition" TA6) or the eUICC 12 is no longer able to process any "applicative" command (e.g., the positive transition sending an abort command and receive ATR TA7) then it remains perpetually in the error state E state, hence the need for the solution here described to reset communication).

In this case thus the error state E is associated to specific conditions regarding acknowledgements, i.e. not receiving data but not receiving either ACK or NACK. This defines for instance a condition in which the eUICC 12 is unresponsive or responds with wrong data.

The clock modifier circuit, or logic module, 111 designed to modify the parameters of the clock signal on the transmitting device in case of irrecoverable error may be for instance a PWM modulation circuit which applies a duty cycle modification. Also the clock modifier circuit or module 111 may be a voltage to frequency converter to apply a clock frequency modification to the clock signal CKS.

The clock sampler circuit, or logic module, 121 designed to detect the modified parameters of the clock signal on the receiving device may be for instance a low pass filter to detect duty cycle variation, which substantially cuts the clock variations, leaving only the average value of the clock signal to pass in order to be analyzed. Also clock sampler circuit, or logic module, 121 may be a frequency-to-voltage converter circuit module to detect frequency variations, which converts clock frequency to a voltage value proportional to frequency variations. Also a pulse counting circuit may be used instead.

The transmitter device 11 is configured to detect a protocol error for instance when during transmission the eUICC 12 is unresponsive or responds with wrong data. The transmitter device 11 can decide to modify the serial clock signal CKS by the circuit 111 to reset the protocol state machine PSM and restart the communication with receiving module, i.e. the eUICC 12.

The eUICC 12 as receiver device is configured, by the circuit 121 to, if any variation, beyond a threshold or tolerance established "a priori", is detected in the parameters of the detected serial clock signal CKS provided by the transmitter 11, generate a reset signal of the transmitter-receiver protocol state machine PSM, i.e. performing said transition from an error state to a reset state.

The serial clock variations may also be used to transmit simple commands or instructions to the eUICC, i.e. commands not related to the need to reset the device, also on different serial interface (e.g., ISO), on which it is coupled connected, that has an accompanying clock.

Thus, in general the method to recover an error state E in a serial communication with an integrated circuit card 12, in particular an eUICC 12, where a serial communication protocol includes a transition from the error state E to a reset state R upon reception of a reset command by said integrated circuit card (12, may include operating on a serial communication interface 12a comprising at least a data line coupling a transmitter device 11 and said integrated circuit card 12, i.e. the clock signal line may not be present. The method in general thus includes, upon detection of an error state E, embedding at the transmitter device 11 a reset signal in a signal transmitted over said clock signal interface to the integrated circuit card 12, which may be preferably the clock signal, but also the data line. The reset signal may be a direct variation of the clock signal on the interface, which becomes the reference internal clock signal at the eUICC 12. Thus checking the presence of said reset signal at the integrated card 12, may be embodied by directly checking parameter changes in the received clock signal CKS or in a clock signal of the integrated circuit card derived from the incoming clock signal CKS, then upon checking the presence of said reset signal at the integrated circuit card performing said transition from an error state E to a reset state R.

Figure 6:
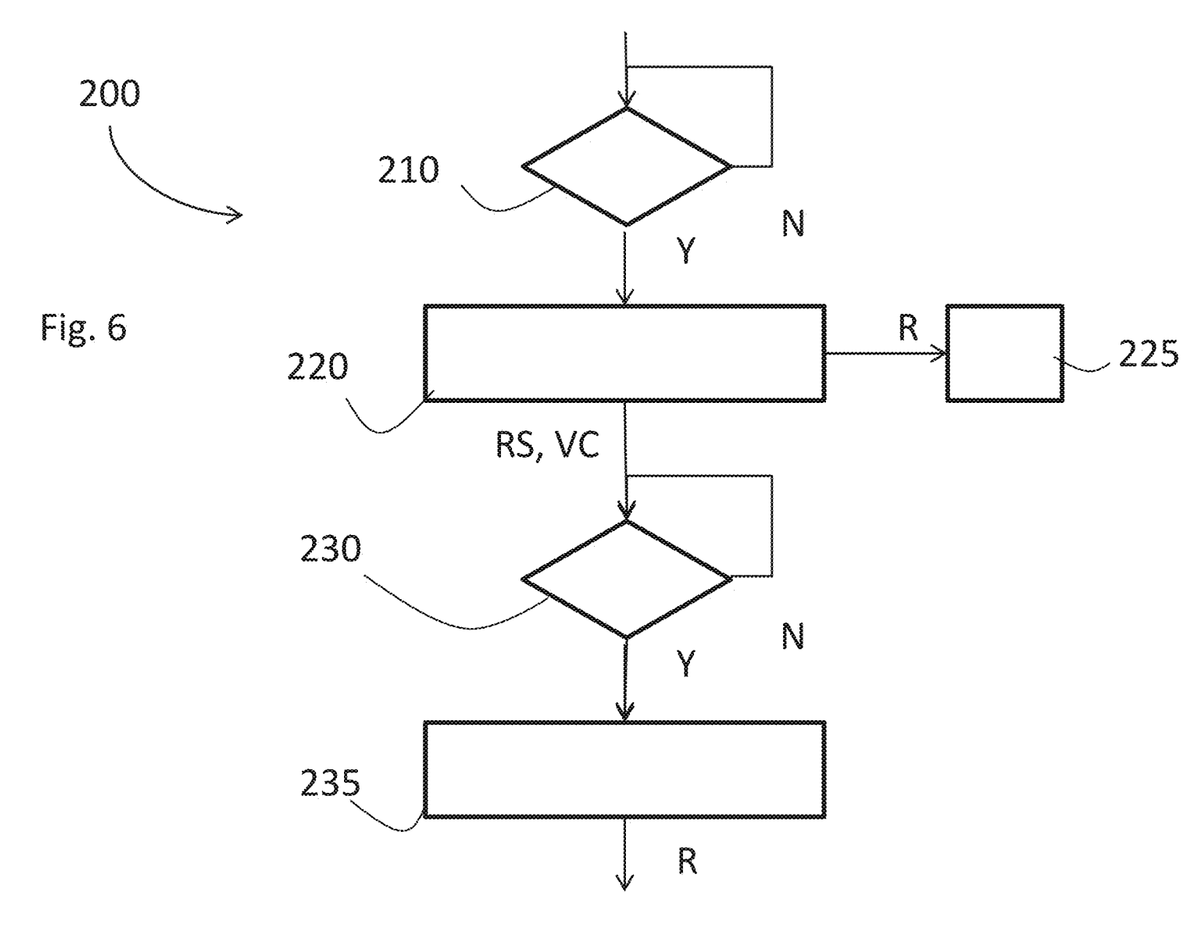
FIG. 6 shows a diagram flow representing an embodiment of the method here described.

In FIG. 6 it is shown a diagram flow of a possible embodiment, indicated with the reference 200, of a method to recover an error state in a serial communication with an integrated circuit card, in particular an eUICC, where the serial communication protocol, as shown in FIG. 1, includes a transition from an error state E to a reset state R upon reception of a reset command by said integrated circuit card. the serial communication including operating on a serial communication interface, as shown in FIG. 2 or 5 comprising at least a data line, e.g. SMI or SMO in SPI as shown in FIG. 3, and a serial clock signal line, e.g. SCK, coupling such transmitter device 11 and integrated circuit card 12.

With 210 is indicated an operation of detection of an error state E, in particular at the transmitter 11, by its processing unit running the serial interface protocol.

With 220 it is indicated, in case an error state E is detected at operation 210, and operation of embedding at the transmitter device 11 a reset signal RS in a serial clock signal CKS sent to the integrated circuit card 12 on said serial clock signal line CKS, said reset signal RS being represented by a variation VC of parameters of the clock signal SCK, i.e. preferably duty cycle variation or frequency clock variation.

In a step 225 subsequently the transmitter 11 enters a reset state.

With 230 it is indicated an operation of checking CC the presence of said variation VC of parameters of the clock signal SCK at the integrated circuit card 12, upon which also the eUICC 12 in a step 235 enters the reset state R, thus the serial interface protocol represented by the transmitter 11 and eUICC 12 performing said transition from an error state E to a reset state R.

The solutions disclosed herein have thus significant advantages with respect to the known solutions.

It is underlined that, although in the flow diagram operations 225 and 235 regarding the transmitter 11 and 12 going in the reset state R are shown as subsequent they are aligned in time, as shown in FIG. 4, as they both enter the clock processing state CP during which variation VC and check CC are performed, and then enter the reset state R in a time aligned manner.

The solution just described allows transmission protocol state machine error recovery for eUICC sub-systems where a specific reset pin is not available or too expensive, or it is not possible to turn off and on the power supply.

Of course, without prejudice to the principle of the invention, the details of construction and the embodiments may vary widely with respect to what has been described and illustrated herein purely by way of example, without thereby departing from the scope of the present invention, as defined by the ensuing claims.

What is claimed is:

1. A method for recovering an error state of an integrated circuit card, wherein the integrated circuit card is coupled to a transmitter device via a serial communication interface comprising at least a serial clock signal line on which a serial clock signal is transmittable from the transmitter device to the integrated circuit card, the method comprising:

upon detecting the error state, embedding, by the transmitter device, a reset signal in the serial clock signal;

sending, by the transmitter device, the serial clock signal as reference clock signal on the serial clock signal line to the integrated circuit card, the reset signal representing a variation of parameters of the serial clock signal;

checking, by the integrated circuit card, a presence of the variation of parameters of the serial clock signal; and upon checking the presence of the variation of parameters, performing, by the integrated circuit card, a transition from the error state to a reset state.

2. The method according to claim 1, wherein the variation of parameters of the serial clock signal at the integrated circuit card comprises a variation of clock signal frequencies.

3. The method according to claim 2, wherein the variation of parameters include voltage to frequency conversions.

4. The method according to claim 1, wherein the variation of parameters comprise clock duty cycle variations.

5. The method according to claim 4, wherein the variation of parameters comprises clock duty cycle variations varied by a pulse width modulation.

6. The method according to claim 1, wherein the variation of parameters comprises additional instructions to the integrated circuit card different from the reset signal.

7. The method according to claim 1, wherein, upon detecting the error state, the transmitter device and the integrated circuit card enter a clock processing state during which they perform the variation of parameters of the serial clock signal, and wherein, upon checking the presence of the variation of parameters, the transmitter device and the integrated circuit card enter the reset state in a time aligned manner.

8. The method according to claim 1, wherein the integrated circuit card is an embedded Universal Integrated Circuit Card (eUICC), and wherein the transmitter device is a card-reader.

9. The method according to claim 1, wherein the integrated circuit card does not have a reset pin.

10. A communication system comprising:
a transmitter device;
an integrated circuit card; and
a serial communication interface comprising at least a serial clock signal line coupling the transmitter device and the integrated circuit card,
wherein the transmitter device is configured to:
upon detection of an error state, embed, a reset signal in a serial clock signal, and
send the serial clock signal as reference clock signal on the serial clock signal line to the integrated circuit card, the reset signal representing a variation of parameters of the serial clock signal, and
wherein the integrated circuit card is configured to:
check a presence of the variation of parameters of the serial clock signal, and
perform a transition from the error state to a reset state when the variation of parameters are present.

11. The communication system according to claim 10, wherein the transmitter device includes a clock modifier circuit configured to perform the variation of parameters of the serial clock signal.

12. The communication system according to claim 11, wherein the integrated circuit card includes a clock sampler circuit configured to detect the variation of parameters of the serial clock signal on the serial clock signal line of a serial communication interface.

13. The communication system according to claim 10, wherein the integrated circuit card is an embedded Universal Integrated Circuit Card (eUICC), and wherein the transmitter device is a card-reader.

14. The communication system according to claim 10, wherein the communication system is a mobile communication device.

15. The communication system according to claim 10, wherein the variation of parameters of the serial clock signal comprises a variation of clock signal frequencies.

16. The communication system according to claim 10, wherein the variation of parameters of the serial clock signal comprises clock duty cycle variations.

17. The communication system according to claim 10, wherein the integrated circuit card does not have a reset pin.

18. A non-transitory machine readable storage medium storing instructions which, when executed by an apparatus, causes the apparatus to:
upon detection of an error state, embed, by a transmitter device, a reset signal in a serial clock signal;
send, by the transmitter device, the serial clock signal as reference clock signal on a serial clock signal line to an integrated circuit card, the reset signal representing a variation of parameters of the serial clock signal;
check, by the integrated circuit card, a presence of the variation of parameters of the serial clock signal; and
perform, by the integrated circuit card, a transition from the error state to a reset state when the variation of parameters are present.

19. The non-transitory machine readable storage medium according to claim 18, wherein the variation of parameters of the serial clock signal comprises a variation of clock signal frequencies.

20. The non-transitory machine readable storage medium according to claim 18, wherein the variation of parameters of the serial clock signal comprises clock duty cycle variations.

* * * * *